United States Patent
Sivathanu et al.

(10) Patent No.: US 6,355,930 B1
(45) Date of Patent: Mar. 12, 2002

(54) FAST INFRARED LINEAR IMAGE OPTICAL INSTRUMENTS

(75) Inventors: Yudaya R. Sivathanu; Rony K. Joseph, both of W. Lafayette, IN (US)

(73) Assignee: EN'URGA, Inc., West Lafayette, IN (US)

( * ) Notice: Subject to any disclaimer, the term of this patent is extended or adjusted under 35 U.S.C. 154(b) by 0 days.

(21) Appl. No.: 09/237,014

(22) Filed: Jan. 25, 1999

(51) Int. Cl.⁷ .................................................. G01J 5/02
(52) U.S. Cl. ........................... 250/339.02; 250/339.03; 250/370.06; 250/370.15; 250/352
(58) Field of Search ........................ 250/339.02, 339.03, 250/370.06, 370.15, 352

(56) References Cited

U.S. PATENT DOCUMENTS

| | | | | |
|---|---|---|---|---|
| 4,948,976 A | * | 8/1990 | Baliga et al. | 250/370.06 |
| 5,127,728 A | * | 7/1992 | Warren et al. | 356/302 |
| 5,166,755 A | | 11/1992 | Gat | |
| 5,394,237 A | * | 2/1995 | Chang et al. | 356/328 |
| 5,420,681 A | * | 5/1995 | Woodruff | 356/326 |
| 5,422,483 A | | 6/1995 | Ando et al. | |
| 5,473,162 A | * | 12/1995 | Busch et al. | 250/341.6 |
| 5,655,138 A | * | 8/1997 | Kikinis | 710/68 |
| 5,804,827 A | * | 9/1998 | Akagawa et al. | 250/370.06 |
| 6,072,578 A | * | 6/2000 | Ischdonat et al. | 356/325 |

OTHER PUBLICATIONS

SW Kubala, et al., "Design and performance of a direct-reading, multichannel spectrometer for the determination of chlorinated purgeable organic compounds by flame infrared-emmision spectrometry", 1991, Talanta 38:589–602.*

* cited by examiner

*Primary Examiner*—Seungsook Ham
*Assistant Examiner*—Shun Lee
(74) *Attorney, Agent, or Firm*—Brinks Hofer Gilson & Lione

(57) ABSTRACT

An infrared spectrometer is adapted to capture spectral data at high frequency and includes an aperture defining slit and tuning fork chopper for periodically admitting infrared radiation. A lens and a plurality of mirrors direct the infrared radiation through pair of calcium fluoride prisms that split the infrared radiation into spectral components. The spectral components are directed by an additional mirror and lens to an array of lead selenide pixels that generate a set of data indicative of the spectral component intensities. Data collection circuitry coupled to the pixel array and coupled to the tuning fork chopper collects the set of data at a selectable rate at least once during each opening of the aperture. A serial output on the data collection circuitry provides a list of data values representative of the spectral intensity at each pixel which can be then stored in a mass storage device as well as immediately analyzed based on selected criteria.

25 Claims, 6 Drawing Sheets

FAST INFRARED LINEAR IMAGE OPTICAL INSTRUMENTS

CONTRACTUAL ORIGIN OF THE INVENTION

The U.S. Government has certain rights in this invention under Contract No. NAS3-98079 between the National Aeronautics and Space Administration and En'Urga Inc., West Lafayette, Ind.

BACKGROUND OF THE INVENTION

The present invention is directed generally to infrared optical instruments such as cameras and spectrometers, and particularly to such cameras and spectrometers as are able to obtain data at a high repetition rate. Infrared cameras and spectrometers capable of repeatedly obtaining data many times per second are desirable to provide detailed information in dynamic thermal situations such as occur in fires and high temperature manufacturing and processing operations.

Obtaining accurate information on the structure of fires is vital in a wide variety of situations. These include the detection of pollutant emissions and process variations requiring control in industrial applications as well as fire detection and safety situations. The structure of fires can be determined experimentally by measuring the gas velocity, gas species concentrations and temperatures in non-luminous flames. In luminous flames, additional information on the soot volume fraction or particulate concentrations is also important. In turbulent and transient flames, these measurements are preferably made simultaneously so that any cross-correlation between them can be computed as well.

Most combustion processes, whether accidental or in industrial burners, gas turbine engines or other machines that use hydrocarbon fuels, emit $H_2O$ and $CO_2$ as the major byproducts of combustion. In order to estimate flame or hot gas temperature, as well as gas species concentrations in reacting flows, it is critical to obtain simultaneously emission or absorption spectra from the fundamental $H_2O$ (2.7 $\mu m$) and $CO_2$ (4.4 $\mu m$) bands. In addition, most accidental and industrial flows are turbulent. Therefore, it is an object of the present invention to obtain the desired thermal spectra over very short periods of time to prevent blurring of the information. It is additionally desirable to provide a dynamic time-based set of data by obtaining the spectra repeatedly at a high interval rate reflecting the short period of time required to eliminate data blurring.

Likewise, many industrial processes involve the thermal treatment of flows of materials although not involving flames or combustion. The uniformity of the products of these industrial processes is often achieved through close control of the thermal characteristics. Thus, it is often desirable to continuously measure the thermal characteristics of a flow of materials, such as continuously extruded polymer films, to detect any thermal change that might portend an undesirable modification in the product. It is often desirable to measure the absorption of thermal energy over a large number of wavelengths at a sufficiently fast rate so as to enable on-line monitoring of a process, for example, in food and chemical processing lines. An object of the present invention is to have the thermal measurements preferably taken as often as possible over the smallest physical region possible so as to isolate any area of possible product change. At the same time, it is desirable to assay the entire product flow, not just discrete portions thereof, so that any changes in thermal characteristics can be identified as soon as they occur with some precision as to location. The thermal measurements are most desirably made by a thermal imaging camera having a data output that could possibly be used as an input for a closed loop process control.

The general design of cameras and spectrometers of the present invention that allow the above design objectives to be met are preferably constructed so as to be minimally affected by the vibration commonly present in industrial situations. The cameras and spectrometers of the present invention are preferably constructed using principally off-the-shelf elements that are competitively priced to maintain the cost of the overall instrument at a reasonable level.

The use of charge storing photon integration devices to form one and two-dimensional opto-electric arrays for converting infrared radiation into a suitable electronic signal is known, for example, from U.S. Pat. No. 5,166,755. The arrays generally consist of a specific arrangement of closely adjacent photosensitive sites, elements, or pixels situated on a monolithic substrate and directly coupled to electronic elements that permit interrogation of the array by scanning or polling. The information gathered by the interrogation can thereafter be processed and/or stored for contemporaneous or future readout or display. The arrays specifically take the form of CCDs, CIDs, DDPDs, SSPDs, or the like which include an integrated circuit which contains the electronics for sequentially scanning and reading the signal of each pixel in the array in a designated order. The electronic circuitry can also include elements for calibration, pixel spectral response correction, pixel uniformity corrections, background signal suppression, dark current suppression, time delay integration, and various other signal enhancements. The photosensitive pixels are disclosed to be constructed using materials specifically selected for infrared sensitivity such as PtSi, HgCdTe, or InSb, which are also disclosed to be used in U.S. Pat. No. 5,420,681. In some situations, electronic gating is employed in the place of a mechanical shutter to control the output signal in relation to the optical input. The arrays are specifically disclosed in relation to their use in infrared spectrometers, but other uses for similar devices are suggested such as in thermal imaging cameras. The systems are, however, unable to provide data over the whole range of from 1.2 to 5 $\mu m$ at temperatures ranging from 210 to 293° K and require cooling with cryogenic liquids such as $N_2$ which is undesirable, particularly in the case of portable equipment.

The use of a sixty-four element PbS detector array in an infrared spectrometer is disclosed in U.S. Pat. No. 5,394,237. The array is coupled to a multiplexer which sequentially samples the signal level from each detector in the array to arrive at an output which is fed to an amplifier and then to an analog/digital converter. The digital output from the converter is controlled by a decoder coupled to receive signals from and send output signals to a standard parallel port of a personal computer for data storage, display, and/or processing. The spectrometer also includes a chopper-type shutter located at the entrance slit and controlled by control circuitry to open for a programmed number of read cycles of the decoder and to then close for another programmed number of read cycles. The output obtained during the closed shutter condition is employed to provide a dark current baseline measurement for correction of the light current measured signal. The entire spectra can be sampled at a rate of 80 Hz using this instrument. This instrument avoids the need to use liquid cryogenic cooling by adopting the more sensitive PbS array that is sensitive over the range of from 1.0 $\mu m$ to 3.0 $\mu m$. However, the instrument as a whole fails to have a satisfactory useful spectral range due to the use of a grating that causes multiples of any given wavelength, e.g. 1.2 μm and 2.4 μm, to be dispersed to the same location on the array. Thus, the instrument is usefully functional only over a range of either from 1.0 μm to 2.0 μm, or from 1.5 μm to 3.0 μm. The upper limit of sensitivity of 3.0 μm also fails to include the hot $CO_2$ (4.4 μm) band which is very desirable in any analysis of combustion or other processes where hot $CO_2$ might be present. The sampling rate of 80 Hz is also less than desirable for use in high-speed industrial processes.

A near infrared analyzer employing a PbS array containing 256 pixels is disclosed in U.S. Pat. No. 5,422,483 for use in the range of from 1.0 μm to 2.6 μm. Alternatives for the PbS array are indicated to be made of InGaAs, InGaAsP, or PtSi. The array is used with a diffraction grating to analyze the infrared signature of, for example, processed foods for protein and water content. This analyzer omits not only the hot $CO_2$ (4.4 μm) band which is very desirable in any analysis of combustion, it also omits the fundamental $H_2O$ (2.7 μm) band as well. The output from the array is to a preamplifier and integrator. The integrated signals are sequentially retrieved by a multiplexer and delivered through an A/D converter to a central processing unit of a personal computer (PC-CPU). There is no specific disclosure of the protocol employed for transfer of the data to the PC-CPU. It is likely that a standard serial or parallel port using RS122 was employed much like that disclosed in U.S. Pat. No. 5,394,237, which significantly limits the data transfer rate from the analyzer to the PC-CPU.

SUMMARY OF THE INVENTION

An infrared detector adapted to capture data at a high repetition rate includes a base with an aperture-defining element fixed to the base for periodically admitting infrared radiation from a source. An at least one dimensional array of pixels is fixed to the base so as to be optically aligned with the elongated source to intercept the periodically admitted infrared radiation for generating a set of data indicative of the infrared characteristics of the source. A data collection element is coupled to the pixel array and to the aperture defining element for collecting the set of data a selected number of times during each opening of the aperture defining element. A serial output on the data collection element provides a list of data values representative of the infrared intensity at each pixel following each collection of data which is transferred to a resident memory by means of a universal serial bus which allows for very rapid data acquisition at rates up to 6250 Hz.

Preferably, the base forms a portion of an enclosure. The radiation from the source enters the enclosure through an input port and is incident upon an entrance slit that provides the desired spatial resolution of the infrared radiation source. The aperture-defining element includes a chopper, such as a tuning fork chopper, driven at a defined frequency of between about 300 Hz and 25 kHz. If the source is large and located very near the slit, an additional imaging element is not required to image the source onto the slit. A plurality of optical components then direct the infrared radiation from the aperture defining element to the at least one dimensional array of pixels. A plurality of fixed mounts are provided for mounting each optical component to the base at a single pre-selected fixed position that defines the optical alignment between the source and the array of pixels and thereby minimizing the influence of environmental vibration.

The optical elements can include lenses and mirrors, and in the case of a spectrometer, also includes at least one spectrum splitting element fixed to the base for dividing the admitted infrared radiation into spectral components that are displayed across the array of pixels. As the wavelength varies across the desired spectrum, the slit image shifts along the detector array. In a thermal imaging camera according to the present invention, the thermal measurements are most desirably made by the optical elements aligning a plurality of regions of the elongated source with various regions of the array of pixels.

The spectrum splitting element employed in a spectrometer of the present invention preferably takes the form of at least one prism composed of a material selected from the group consisting of calcium fluoride and lithium fluoride, although a diffraction grating could be employed with significantly diminished spectral scope. The preferred instrument uses a pair of equilateral calcium fluoride dispersing prisms mounted in close proximity to each other which avoids the multiple wavelength problem common to all diffraction grating systems.

The pixel array is preferably composed of PbSe since such an array is responsive to radiation over the range of from 1.2 μm to 5.0 μm thereby including both the hot $CO_2$ (4.4 μm) band and the fundamental $H_2O$ (2.7 μm) band. The PbSe pixel array can be combined with a diffraction grating adapted to detect radiation having a wavelength of at least between about 2.5 and 4.6 μm without experiencing the wavelength multiple problem previously identified yet still including the most desirable data bands. The preferred array includes 160 pixels arranged as two adjacent parallel rows that are 4 mm in length. The pixels of the preferred array are divided into two banks of 80 pixels corresponding to the two rows and referred to as the odd and even banks. The image of the slit is preferably over two pixels wide and is dispersed lengthwise over less that the entire length of the array to compensate for any error in alignment. In the preferred embodiment the slit image occupies about 90% of the pixel row length.

The pixel array provides an analog current output that is proportional to the change in light energy falling on each of the elements. This change in intensity is created by the motion of the chopper past the slit. The current from each element in a bank is multiplexed onto the output by a clock input at a fixed frequency, preferably at about 1 MHz. The multiplexed current is converted into voltages using a biasing circuit and then amplified. The digital and analog components required for the pixel array, the chopper, the multiplexer and the amplifier are provided by a drive circuit.

The amplified signal from the array is sampled when the chopper is opened and closed to provide a plurality of voltages from the entire array. The differences in the voltages with the chopper opened and closed respectively, provide a direct measure of the intensity of light incident on the pixel elements of the array. The voltage differences are digitized by an analog to digital converter and the data collected can then be directly transferred to a suitable computer memory at a rate reflective to the data acquisition rate. The output of data to the computer memory is via a universal serial bus.

One distinct feature of the present invention is the use of a unitary base and a plurality of fixed mounts provided for mounting each optical component to the base at a single pre-selected fixed position that defines the optical alignment between the source and the pixel array. This feature has the advantage of minimizing the influence of environmental vibration on the optical instrument.

Another distinct feature of the present invention is the alignment of the image of the slit so that it is dispersed lengthwise over less than the entire length of the array, while the slit image width in the cross-dispersion direction is greater than the width of the array. The feature has the advantage of providing an automatic compensation for small errors in alignment. In the preferred embodiment the slit image occupies about 90% of the pixel row length.

Yet another distinct feature of the present invention is the use of a PbSe array which ensures the collection of data over a range including both the hot $CO_2$ (4.4 $\mu$m) band and the fundamental $H_2O$ (2.7 $\mu$m) band.

Still another distinct feature of the present invention is the use of one or more prisms composed of a material selected from the group consisting of calcium fluoride and lithium fluoride, which avoids the multiple wavelength problem common to all diffraction grating systems.

An additional distinct feature of the present invention is the use of a universal serial bus for data transfer from the A/D data converter at the output of the array to the memory which allows for much higher data acquisition rates than can possibly be accomplished using a standard serial or parallel port using RS122 or similar protocol.

Other features and advantageous of the present invention will become apparent to those skilled in the art from a consideration of the following description of preferred embodiments of the invention. The description has reference to the accompanying drawings that illustrate the best mode of the invention.

DESCRIPTION OF THE PREFERRED EMBODIMENTS

Figure 1:
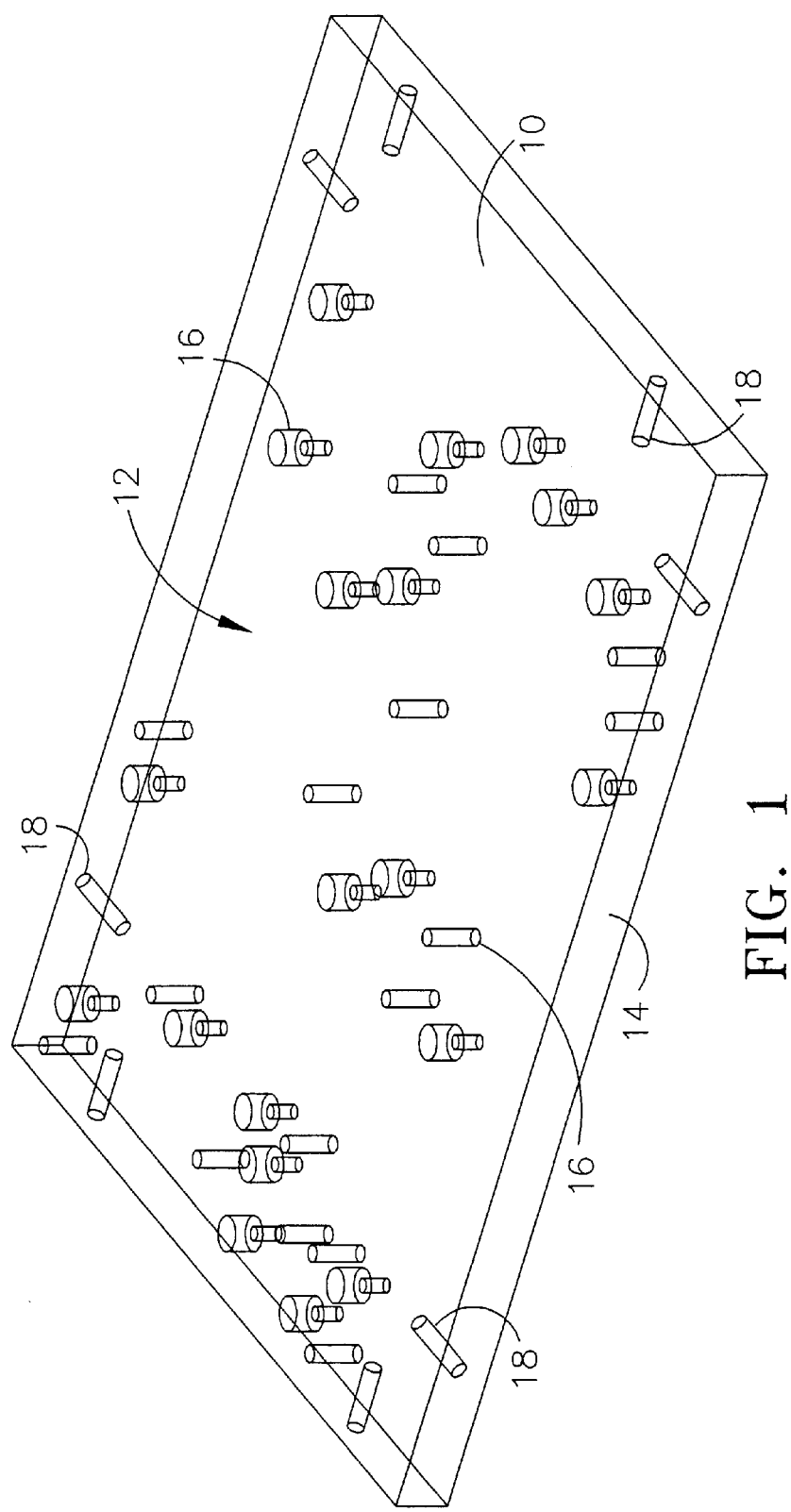
FIG. 1 is a perspective view of a base plate employed in a spectrometer constructed in accordance with the present invention.

A base plate 10 for an infrared optical instrument in accordance with the present invention, specifically a spectrometer, is shown in FIG. 1 to have an upper surface 12 bounded by a rectangular edge 14. A plurality of openings 16 penetrate the base plate 10 from a lower surface to the upper surface 12 at pre-selected positions for receiving fasteners for fastening elements to the upper surface 12 at fixed positions. A plurality of peripheral openings 18 extend inward from the rectangular edge 14 to receive fasteners securing four walls to the base plate 10.

Figure 2:
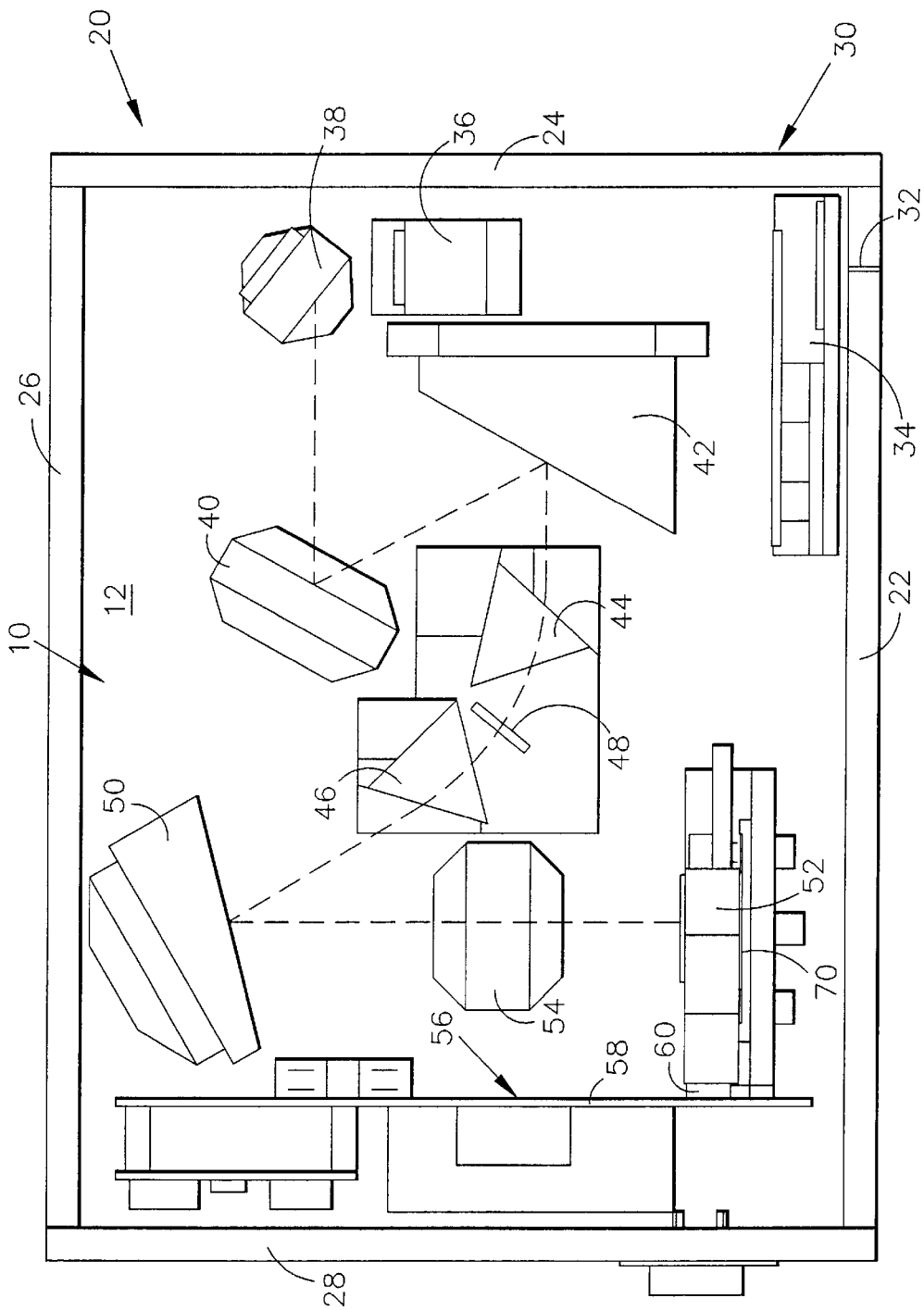
FIG. 2 is plan view of a spectrometer constructed in accordance with the present invention employing the base plate of FIG. 1.

The optical elements that form the spectrometer 20 are fixed to the base plate 10 within the four 7.6 cm high walls 22–28 as shown in FIG. 2 defining a 16.5×19.1×7.6 cm box 30. Wall 22 includes a slit 32 that is 1 mm wide in the dispersion direction and between 1.35 and 3.0 mm wide in the cross-dispersion direction for admitting an infrared radiation into the box 30. A tuning-fork chopper 34 is situated immediately inside the slit 32 for chopping incident radiation, preferably at a rate of 300 Hz, into pulses of defined duration. A two-element refractive relay lens 36, such as a $CaF_2$ bi-convex lens having a focal length, F=19 mm, and diameter D=1.27 cm, focuses incident radiation passing the chopper 34 to form a reduced intermediate image of the slit 32. Two front surface silvered, planar mirrors 38 and 40 fold the beam of chopped incident ration towards a first off-axis parabolic mirror 42. The first off-axis parabolic mirror 42 is a circular section of a parabolic mirror that collimates the diverging beam of chopped incident radiation toward the focal point of the parabola.

Two $CaF_2$ or $LiF_2$ equilateral dispersing prisms 44 and 46 intercept the collimated beam reflected from the first off-axis parabolic mirror 42 and disperse the incident radiation into a beam of spectral components. An aperture stop 48 is preferably located between the two prisms having a diameter of 6.38 mm to exclude extraneous radiation. A second off-axis parabolic mirror 50, similar to parabolic mirror 42, focuses the beam of spectral components towards a detector array 52 to produce an image of the slit. A refractive silicon lens 54 is used to provide further focusing power and to set the focal length required for producing the desired image width at the detector array 52.

The detector array 52 comprises two adjacent, close-packed rows of 80 PbSe pixels, each pixel being 0.025× 0.034 mm in size, the array 52 having an overall size of 4.06×0.05 mm. The two off-axis parabolic mirrors 42 and 50, and silicon refractive lens 54 provide a reduction of the slit image to achieve a four pixel wide image of the slit at the detector array in the cross array direction. The size of the beam of spectral components at the detector is 3.64 mm wide, which underfills the detector array 52 by about 10%. This allows for some centration error of the detector array 52. A wavelength map, Table 1, is given at the detector that shows that the wavelengths are not mapped linearly across the detector array 52. The wavelength hitting the center of the detector is 3.626 $\mu$m. From the data provided in Table 1, one can determine an equation describing the position at the detector for each wavelength. The imaging performance of the preferred design is such that, for a pixel size of 0.025 mm, the preferred design has an 80% encircled energy of 2.46 pixels at 2.50 $\mu$m, 1.88 pixels at '3.626 $\mu$m, and 3.66 pixels at 4.50 $\mu$m.

TABLE 1

| Wavelength ($\mu$m) | Detector Position (mm) |
| --- | --- |
| 2.500 | 1.8192 |
| 2.600 | 1.6813 |
| 2.700 | 1.5389 |
| 2.800 | 1.3920 |
| 2.900 | 1.2405 |
| 3.000 | 1.0844 |
| 3.100 | 0.9237 |
| 3.200 | 0.7582 |
| 3.300 | 0.5882 |
| 3.400 | 0.4134 |
| 3.500 | 0.2339 |
| 3.600 | 0.0497 |
| 3.700 | −0.1392 |
| 3.800 | −0.3328 |
| 3.900 | −0.5311 |

TABLE 1-continued

| Wavelength (μm) | Detector Position (mm) |
|---|---|
| 4.000 | −0.7341 |
| 4.100 | −0.9418 |
| 4.200 | −1.1542 |
| 4.300 | −1.3712 |
| 4.400 | −1.5929 |
| 4.500 | −1.8192 |

Figure 3:
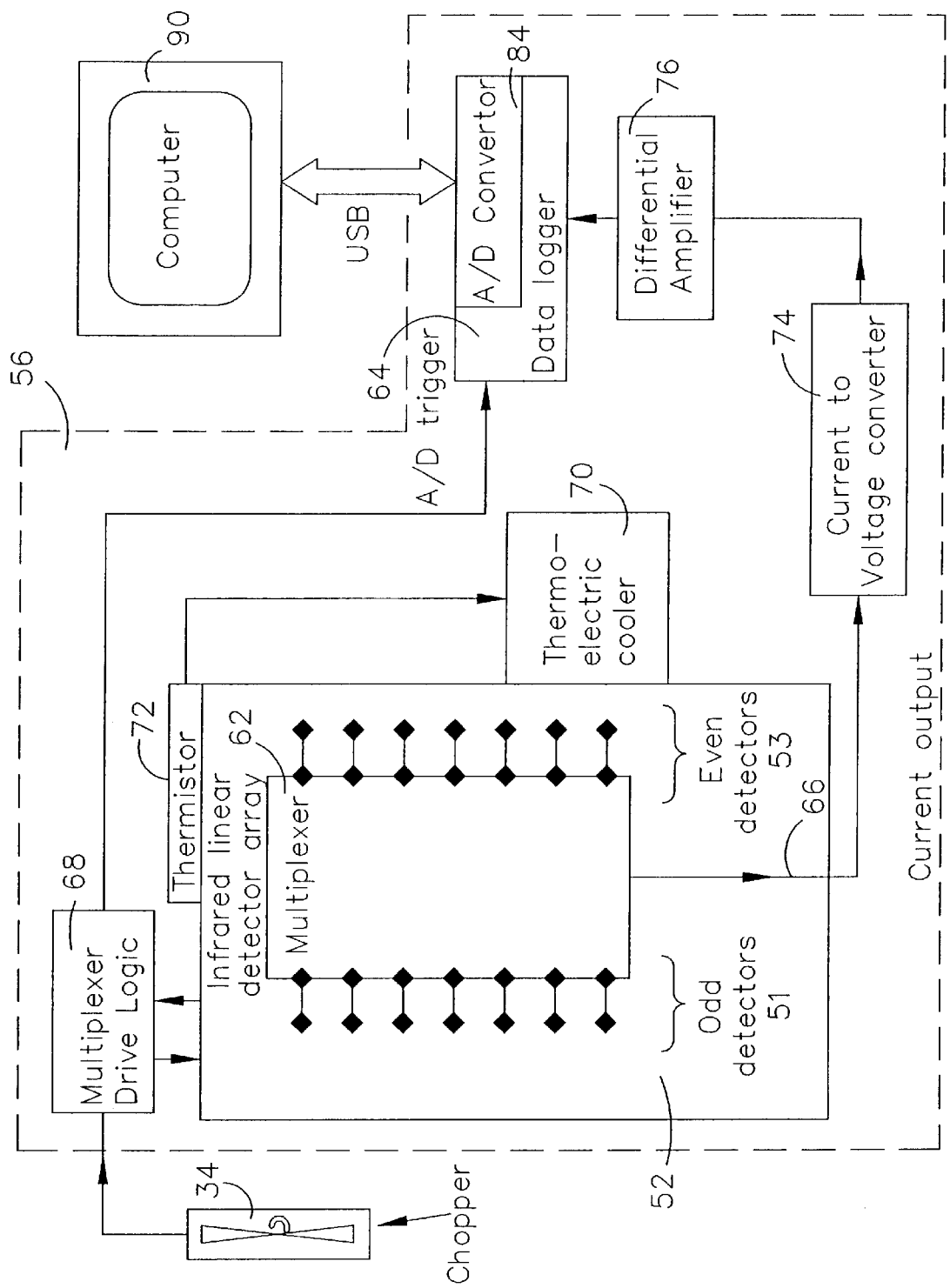
FIG. 3 is a block diagram of the linear detector array electronics of an optical instrument of the present invention such as the spectrometer shown in FIG. 2.

The two rows of pixels forming the linear detector array 52 are designated as a set of odd detectors 51 and a set of even detectors 53 as schematically shown in FIG. 3. The detector array 52 is driven using a drive circuit 56 implemented on a printed circuit board 58 specifically developed for this application. The printed circuit board was designed so that the linear array detector 52 could be directly plugged on to an onboard socket 60, eliminating cabling between the detector 52 and the drive circuit 56. The drive circuit 56 has four main functions: (a) to generate a clock signal and odd/even signals required by the multiplexer 62; (b) to generate the analog voltages required by the linear detector array 52; (c) to interface the detector array 52 to the chopper 34, and to provide clock and odd/even outputs to the data logger 64; and (d) to convert the current output of the detector array 52 to a voltage output and to amplify the output voltage.

Each of the 160 pixels of the detector array 52 provides a single analog current output (1/0+ and 1/0−) which is proportional to the change in light energy falling on the pixel. Each pixel element in one of the sets 51 or 53 is multiplexed onto an output 66 of the multiplexer by a clock input provided by the multiplexer drive logic 68, preferably at a rate of 1 MHz. A second signal input to the multiplexer 62 from the drive logic circuit 68 allows the selection of the odd detector set 51 or the even detector set 53. In addition to the 80 elements forming the output from the pixels of one of the sets 51 or 53, a dummy element is inserted at the beginning and end of each readout by the multiplexer 62. Therefore, a total of 82 clock cycles must be provided to read all of the elements in each bank. A 1 MHz clock is provided in the drive circuit 56 that operates continuously as soon as the drive circuit 56 is switched on. The drive circuit 56 also provides +12V, −12V, +5V, −5V power supplies and ground using conventional electronic components.

A thermoelectric cooler 70 is fixed to the infrared linear detector array 52 to cool the array to a specified operating temperature. The cooler power supply is a constant current supply (0.6 amps), with voltage varying between 0–12V. The constant current supply is provided by the drive circuit 56. A thermistor 72 is provided for measuring the temperature of the array 52 to control the supply voltage.

The incoming light is chopped by the chopper 34 (at 300 Hz), since the pixel elements 51 and 53 respond only to changes in radiation intensity. The drive circuit 56 passes the +12V supply through to the tuning fork chopper 34. The chopper 34 provides a 0–10V square wave, which is 90° out of phase with the actual chopper opening, which is sent to the data-logger 64. A Norton amplifier 74 converts the current output from the multiplexer 62 to a voltage signal. This signal is then amplified by a differential amplifier 76, the gain of which is preferably set at 10. The differential amplifier 76 is supplied with +10.5V and −10.5V generated by the drive circuit 56. The amplified output from the differential amplifier 76 is then supplied to the data logger 64.

Figure 6:
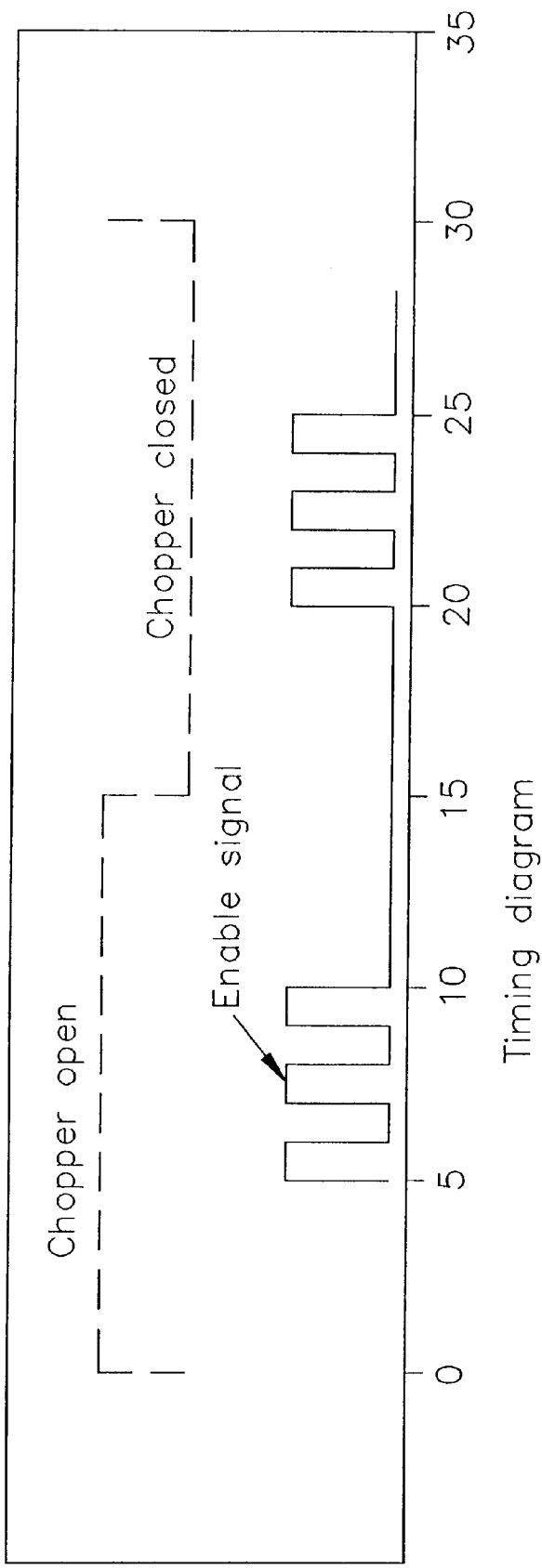
FIG. 6 is a graph of an enable signal generated by the drive logic circuit 68 during the open and closed positions of the chopper 34 which is fed to the data-logger 64 to control the data output from the apparatus of the present invention.

The data-logger 64 is a stand-alone printed circuit card that can be housed as shown in FIG. 3 within enclosure 20 or situated in a separate enclosure and connected to the drive circuit 56 within enclosure 20 by suitable cabling. The data-logger 64 comprises a digital signal processor 78, an onboard memory 80, a universal serial bus micro-controller 82, and an analog to digital converter 84. The analog to digital converter 84 is a high speed converter, such as an Analog Devices AD1761, capable of converting 40 M samples/second, which receives the output of the differential amplifier 76 during a period defined by an enable signal generated by the drive logic circuit 68. This enable signal is correlated with the opening and closing of the chopper 34 as shown in FIG. 6 so that several readings can be taken during both the "open" and "closed" position of the chopper 34. The exact number of readings to be taken is subject to programming of the drive logic circuit 68.

The output of the analog to digital converter 84 is dumped into the onboard buffer memory 80. The information within the buffer memory 80 is processed by the digital signal processor 78, which computes, for example, the average, maximum and minimum pixel values. The signal processor 78, which can be a TMS320C52-100 or equivalent, then processes the entire digital signal to pass it on to the computer 90 by means of the universal serial bus micro-controller 82. The micro-controller 82, which preferably is an AM186CU or equivalent, converts the data to conform to the universal serial bus protocol before sending the data on to the computer 90.

Figure 5:
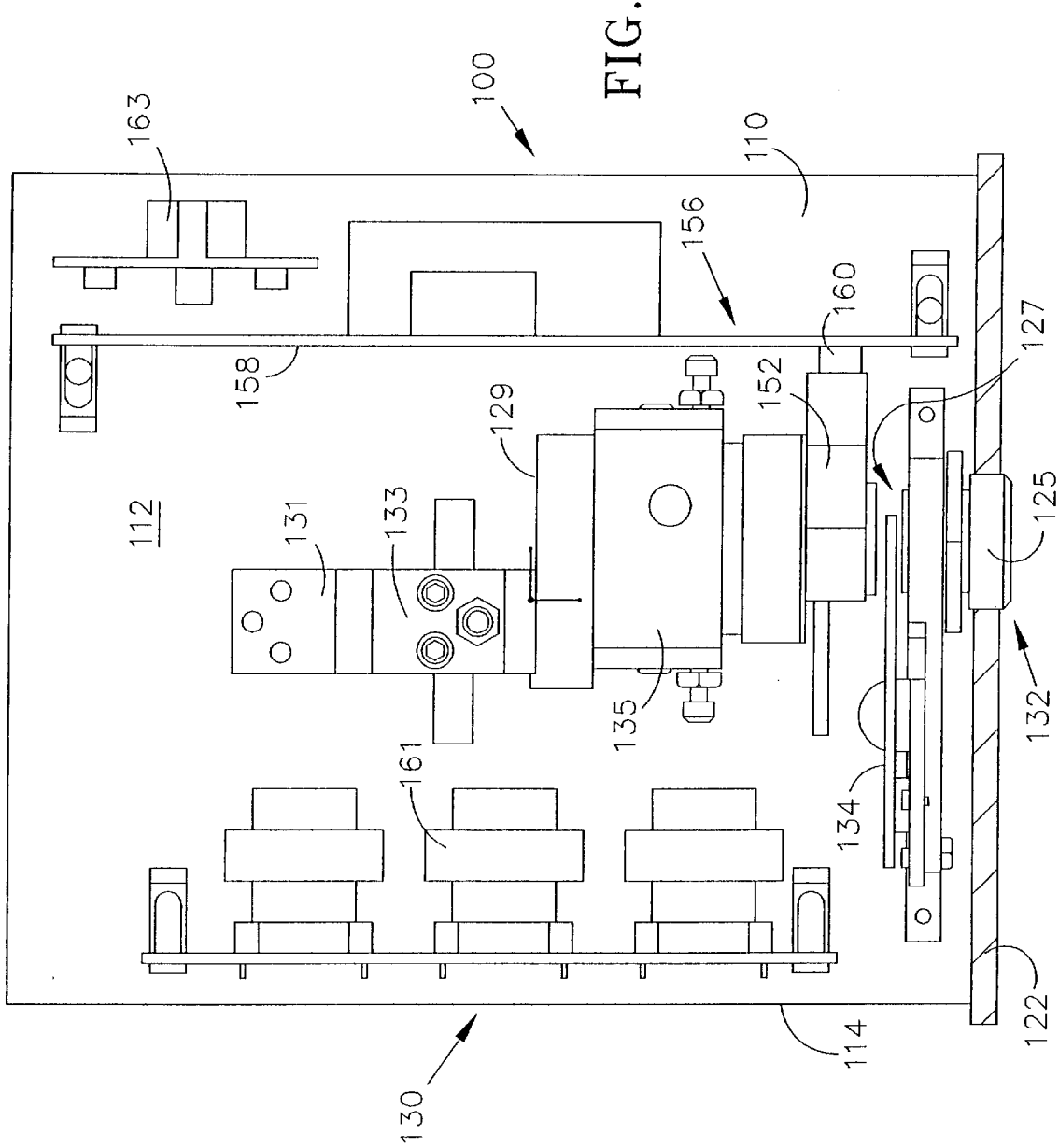
FIG. 5 is a plan view similar to FIG. 2 of a manufacturing process monitoring apparatus constructed in accordance with the present invention.

A manufacturing process monitoring apparatus 100 constructed in accordance with the present invention is shown in plan view in FIG. 5. The monitoring apparatus 100 includes a base plate 110 having an upper surface 112 bounded by a rectangular edge 114. A plurality of openings penetrate the base plate 110 from a lower surface to the upper surface 112 at pre-selected positions for receiving fasteners for fastening various elements of the monitoring apparatus to the upper surface 112 at fixed positions. A plurality of peripheral openings extend inward from the rectangular edge 114 to receive fasteners securing four walls, only one of which is shown, to the base plate 110 to form an enclosure 130.

The front plate 122 of the enclosure 130 includes an opening 132 for admitting infrared radiation to the interior of the enclosure 130. A lens mount 125 mounts a lens 127 at a pre-selected position to receive any infrared radiation passing through the opening 132 in the front plate 122. The lens 127 is selected to capture infrared radiation from a region of interest, which in many manufacturing process operations is an elongated rectangular area or strip orthogonal to a direction of flow of material involved in the process operation. The aspect ratio of the rectangular area or strip under consideration preferably reflects that of the linear detector array employed, which can be, for example, about 80 pixels long. A tuning-fork chopper 134 is situated immediately adjacent the lens 127 for chopping radiation passing through the lens, preferably at a rate of 300 Hz, into pulses of defined duration.

A linear detector array 152 is positioned at the focal plane of the lens 127 to receive the image of the elongated rectangular area or strip being monitored. A two-axis support 129 adjustably supports the linear detector array 152 with respect to the base plate 110. The two-axis support 129 is fixed to the base plate 110 by mounting 131. A Y-axis slide 133 is fixed to the mounting 131 to provide for vertical movement of the array 152 with respect to the base plate 110. An X-axis slide 135 is supported by the Y-axis slide 133 to provide for horizontal movement of the array 152 with respect to the base plate 110. The two slides 133 and 135 can be jointly manipulated to position the detector array 152 at a selected fixed position so that the image of the area being monitored is focused on the detector array 152. The detector array 152 preferably comprises two adjacent, close-packed rows of 80 PbSe pixels, each pixel being 0.025×0.034 mm in size, the array 152 having an overall size of 4.06×0.05 mm. The image of the rectangular area being monitored preferably under-fills the length-wise dimension of the detector array 152 by about 10%, which allows for some positional error of the detector array 152.

Figure 4:
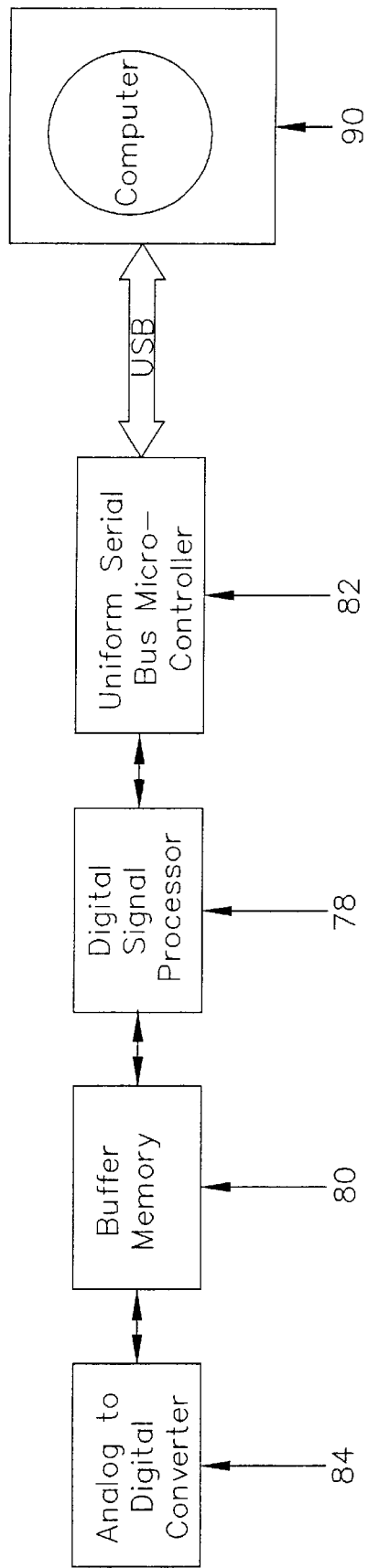
FIG. 4 is a block diagram of the data-logger which is employed to achieve a high repetition rate transfer of information from the optical instrument to a general purpose computer.

The detector array 152 is driven using a drive circuit 156 implemented on a printed circuit board 158. The printed circuit board 158 includes an onboard socket 160 so that the linear array detector 152 could be directly plugged in to the drive circuit 156, thereby eliminating cabling between the detector 152 and the drive circuit 156. The drive circuit 156 is substantially that shown in FIGS. 3 and 4, and provides an output to computer that can be used in manufacturing process evaluation and control. A power supply 161 and drive circuit 163 for the chopper 134 complete the major elements fixed to the base plate 110.

The invention uses a unitary base 10, 110 and a plurality of fixed mounts for mounting each of the optical components 36 through 54, and 127 to the base 10 at single pre-selected fixed positions. The pre-selected positions define the optical alignment between the source of infrared radiation and the pixel array 52, 152 to minimize the influence of environmental vibration on the optical instrument 20, 100. This permits the instrument 20, 100 to be used in portable or mobile situations, or under other conditions where conventional comparable instruments cannot be employed successfully.

The alignment of the image of the slit 32 in the spectrometer 20 so that it is dispersed lengthwise over only about 90% of the entire length of the detector array 52, while the slit image width in the cross-dispersion direction is greater than the width of the array 52 affords an automatic compensation for small errors in alignment of the optical components. Likewise, the alignment of the image of the rectangular area being monitored so that it is focused lengthwise over only about 90% of the entire length of the detector array 152, while the dimension in the direction of the process flow is greater than the width of the array 152 affords an automatic compensation for small errors in alignment of the optical components. This permits the instruments 20 and 100 to be assembled by less-skilled workers thereby contributing to lower construction cost per instrument.

The choice of materials for both the prisms and detector array contributes to optimal performance over a critical infrared range including both the hot $CO_2$ (4.4 $\mu$m) band and the fundamental $H_2O$ (2.7 $\mu$m) band by providing unambiguous spectral information without the use of signal diminishing optical filters.

Finally, the data collected by an optical instrument of the present invention is transferred at exceptionally high rates through the use of a universal serial bus for data transfer at the output of the detector array to the memory which allows for much higher data acquisition rates than can possibly be accomplished using a standard serial or parallel port using RS122 or similar protocol.

While the invention has been described in particular in its relation to the illustrated preferred embodiments, certain variations and equivalents will be within the scope of the invention as defined in the claims.

What is claimed is:

1. An infrared spectrometer adapted to capture spectral data at high frequency comprising: a base, an aperture defining element fixed to the base for periodically admitting infrared radiation, at least one spectrum splitting element fixed to the base for dividing admitted infrared radiation into spectral components, an at least one dimensional array of PbSe pixels, the array extending over a selected length and having a selected width, the array being fixed to the base to intercept the spectral components of the admitted radiation over a range from about 2.5 $\mu$m to about 4.6 $\mu$m for generating a set of data indicative of the spectral component intensities, the array of pixels being fixed to the base so that the dispersion of spectral components is distributed in a dispersion direction over less than the entire length of the array and so that the spectral components are distributed in the cross-dispersion direction over more than the width of the array, a data collection element coupled to the at least one dimension array and coupled to the aperture defining element for collecting the set of data at least once during each opening of the aperture defining element, and a serial output on the data collection element for providing a list of data values representative of the spectral intensity at each pixel following each collection of data.

2. An infrared spectrometer comprising: a base, an aperture defining element fixed to the base for periodically admitting infrared radiation including an entrance slit providing a desired spatial resolution of an infrared radiation source, at least one spectrum splitting element fixed to the base for dividing admitted infrared radiation into a continuous dispersion of spectral components, an at least one dimensional array of pixels situated on a monolithic substrate directly coupled to a data collection that permit interrogation of the array, the array having a defined length and width and being fixed to the base to intercept the continuous dispersion of spectral components of the admitted radiation for generating a set of data indicative of the spectral component intensities within the dispersion, a plurality of optical components for directing the infrared radiation from the aperture defining element to the at least one dimensional array of pixels, and mounting means for mounting each optical component to the base at a single pre-selected fixed position so that the dispersion of spectral components is distributed in a dispersion direction over less than the entire length of the array and so that the spectral components are distributed in the cross-dispersion direction over more than the width of the array.

3. An infrared spectrometer adapted to capture spectral data at high frequency comprising: an aperture defining element admitting infrared radiation at a frequency of at least about 300 Hz, at least one spectrum splitting element receiving the admitted infrared radiation and dividing the infrared radiation into spectral components, an at least one dimensional array of pixels, the array occupying a selected length and width to intercept the spectral components of the admitted radiation for generating a set of data indicative of the spectral component intensities, the array being situated with respect to the at least one spectrum splitting element that the dispersion of spectral components is distributed in a dispersion direction over less than the entire length of the array and so that the spectral components are distributed in the cross-dispersion direction over more than the width of the array, a data collection element coupled to the at least one dimension array and coupled to the aperture defining element for collecting the set of data at least once during each opening of the aperture defining element, and a serial output on the data collection element for providing a list of data values representative of the spectral intensity at each pixel following each collection of data.

4. An infrared detector adapted to capture data at high frequency comprising: a base, an aperture defining element fixed to the base for periodically admitting infrared radiation from an elongated source, at least one spectrum splitting element for dividing admitted infrared radiation into spectral components an at least one dimensional array of pixels situated on a monolithic substrate directly coupled to electronic elements that permit interrogation of the array, the array being fixed to the base so as to be optically aligned with the elongated source to intercept the admitted infrared radiation so that an image of the elongated source is distributed in a lengthwise direction over less than the entire length of the array and so that the image of the elongated source is distributed in the widthwise direction over more than the width of the array for generating a set of data indicative of the infrared characteristics of a plurality of regions of the elongated source, a data collection element coupled to the at least one dimension array and coupled to the aperture defining element for collecting the set of data at least once during each opening of the aperture defining element, and a serial output on the data collection element for providing a list of data values representative of the infrared intensity at each pixel following each collection of data.

5. An infrared spectrometer comprising: a base, an aperture defining element fixed to the base for periodically admitting infrared radiation including an entrance slit providing a desired spatial resolution of the infrared radiation source, at least one prism composed of a material selected from the group consisting of calcium fluoride and lithium fluoride fixed to the base for dividing admitted infrared radiation into spectral components, an at least one dimensional array of pixels situated on a monolithic substrate and directly coupled to a data collection element that permit interrogation of the array, the array having a defined length and width, the array being fixed to the base to intercept the spectral components of the admitted radiation for generating a set of data indicative of the spectral component intensities, a plurality of optical components for directing the infrared radiation from the aperture defining element to the at least one dimensional array of pixels, and mounting means for mounting each optical component to the base at a single pre-selected fixed position so that the spectral components are distributed in a dispersion direction over less than the entire length of the array and so that the spectral components are distributed in the cross-dispersion direction over more than the width of the array.

6. The infrared spectrometer of any of claims 1, 2, 3, 4 or 5 wherein the aperture defining element comprises a chopper operating at a defined frequency of between about 300 Hz and 25 kHz.

7. The infrared spectrometer of claim 6 wherein the aperture defining element further comprises an entrance slit providing a desired spatial resolution of the infrared radiation source.

8. The infrared spectrometer of any of claims 1, 2, 3 or 4 wherein the at least one spectrum splitting element comprises at least one prism composed of a material selected from the group consisting of calcium fluoride and lithium fluoride.

9. The infrared spectrometer of claim 8 wherein the at least one prism comprises a pair of calcium fluoride prisms.

10. The infrared spectrometer of any of claims 1, 2, 3, 4 or 5 wherein the at least one dimensional array of pixels is composed of a material selected from the group consisting of lead selenide and lead sulphide.

11. The infrared spectrometer of any of claims 1, 3 or 4 further comprising a plurality of optical components for directing the infrared radiation from the aperture defining element to the at least one dimensional array of pixels, and mounting means for mounting each optical component to the base at a single pre-selected fixed position.

12. The infrared spectrometer of claim 11 wherein the plurality of optical components includes at least one off-axis parabolic reflector.

13. The infrared spectrometer of claim 2, wherein the plurality of optical components includes an off-axis parabolic reflector situated between the aperture defining element and the at least one spectrum splitting element for collimating the infrared radiation prior to being split into the spectral components.

14. The infrared spectrometer of claim 13 further comprising an off-axis parabolic reflector situated between the at least one spectrum splitting element and the array of pixels for focusing the spectral components of the infrared radiation toward the array of pixels.

15. The infrared spectrometer of any of claims 1, 2, 4 or 5 further comprising a detector assembly fixed to the base including a thermoelectric cooler supporting the array of pixels.

16. The infrared spectrometer of any of claims 1, 2, 3, 4 or 5 wherein the data collection element comprises an analog to digital converter synchronized with the periodic opening and closing of the aperture defining element for detecting the difference in current output of each pixel with the aperture defining element in an open and closed position.

17. The infrared spectrometer of claim 16 further comprising a multiplexer coupled to the analog to digital converter and operating at a frequency at least as great as the aperture defining element for periodically converting the current output of each pixel into a voltage indicative of the intensity of radiation incident on each pixel.

18. The infrared spectrometer of claim 17 further comprising a sampling frequency selector for determining the frequency of operation of the multiplexer relative to the aperture defining element so that more than one voltage indicative of radiation intensity can be detected with each opening of the aperture defining element.

19. The infrared spectrometer of claim 18 further comprising a voltage averaging circuit for averaging for each pixel the voltages detected with each opening of the aperture defining element to minimize noise.

20. The infrared spectrometer of any of claims 1, 3 or 4 wherein the serial output of the data collection element comprises a universal serial bus.

21. The infrared spectrometer of claim 20 further comprising a data holding buffer coupled between the universal serial bus output and the data collection element for providing temporary storage of output data.

22. The infrared spectrometer of claim 21 further comprising a main mass-storage device for storing the output data.

23. The infrared spectrometer of any of claims 1, 2, 3, 4 or 5 wherein the spectral components are distributed in a dispersion direction over only about 90% of the entire length of the array.

24. The infrared spectrometer any of claims 1, 2, 3, 4 or 5 wherein said array of pixels comprises two adjacent, close-packed rows of pixels.

25. The infrared spectrometer of claim 24 wherein each of said rows of pixels comprises 80 pixels.

* * * * *

UNITED STATES PATENT AND TRADEMARK OFFICE
CERTIFICATE OF CORRECTION

PATENT NO. : 6,355,930 B1
DATED : March 12, 2002
INVENTOR(S) : Yudaya R. Sivathanu and Rony K. Joseph It is certified that error appears in the above-identified patent and that said Letters Patent is hereby corrected as shown below:

Column 10,
Line 33, please insert -- element -- after "data collection".

Column 11,
Line 3, please delete "detector" and insert -- spectrometer --.
Line 64, please delete "1".

Signed and Sealed this

Twenty-seventh Day of August, 2002

Attest:

Attesting Officer

JAMES E. ROGAN
Director of the United States Patent and Trademark Office